United States Patent
Ma et al.

(10) Patent No.: US 12,164,030 B2
(45) Date of Patent: Dec. 10, 2024

(54) LOCAL SENSING BASED AUTONOMOUS NAVIGATION, AND ASSOCIATED SYSTEMS AND METHODS

(71) Applicant: SHENZHEN ZHUOYU TECHNOLOGY CO., LTD., Shenzhen (CN)

(72) Inventors: Lu Ma, Shenzhen (CN); Shaojie Shen, Shenzhen (CN)

(73) Assignee: SHENZHEN ZHUOYU TECHNOLOGY CO., LTD., Shenzhen (CN)

( * ) Notice: Subject to any disclaimer, the term of this patent is extended or adjusted under 35 U.S.C. 154(b) by 358 days.

(21) Appl. No.: 17/395,785

(22) Filed: Aug. 6, 2021

(65) Prior Publication Data
US 2021/0365038 A1 Nov. 25, 2021

Related U.S. Application Data

(63) Continuation of application No. PCT/CN2019/075464, filed on Feb. 19, 2019.

(51) Int. Cl.
*G01S 17/86* (2020.01)
*G05D 1/00* (2024.01)
(Continued)

(52) U.S. Cl.
CPC ............ *G01S 17/86* (2020.01); *G05D 1/0214* (2013.01); *G05D 1/0221* (2013.01);
(Continued)

(58) Field of Classification Search
CPC ............ G01S 17/86; G01S 2013/9323; G01S 2013/9324; G01S 15/89; G01S 15/931;
(Continued)

(56) References Cited

U.S. PATENT DOCUMENTS 9,576,185 B1 2/2017 Delp
2007/0282532 A1* 12/2007 Yamamoto .......... B60R 21/0134
701/96
(Continued)

FOREIGN PATENT DOCUMENTS

CN 105492985 A 4/2016
CN 105759295 A 7/2016
(Continued)

OTHER PUBLICATIONS

International Search Report and the Written Opinion of the International Searching Authority, in corresponding PCT Application No. PCT/CN2019/075464, mailed Nov. 19, 2019 (11 pages).
(Continued)

*Primary Examiner* — Adam R Mott
*Assistant Examiner* — Elizabeth Rose Neleski

(57) ABSTRACT

Local sensing based navigation maps can form a basis for autonomous navigation of a mobile platform. An example method includes obtaining real-time environment information that indicates an environment within a proximity of the mobile platform based on first sensor(s) carried by the mobile platform, detecting navigation features based on sensor data obtained from the first sensor(s) or second sensor(s) carried by the mobile platform, integrating information corresponding to the navigation features with the environment information to generate a local navigation map, and generating navigation command(s) for controlling a motion of the mobile platform based on the local navigation map.

19 Claims, 10 Drawing Sheets

(51) Int. Cl.
*G06V 10/143* (2022.01)
*G06V 10/82* (2022.01)
*G06V 20/56* (2022.01)
*G06V 20/58* (2022.01)

(52) U.S. Cl.
CPC ......... *G05D 1/0223* (2013.01); *G05D 1/0242* (2013.01); *G05D 1/0248* (2013.01); *G05D 1/0251* (2013.01); *G05D 1/0274* (2013.01); *G06V 10/143* (2022.01); *G06V 10/82* (2022.01); *G06V 20/58* (2022.01); *G06V 20/582* (2022.01); *G06V 20/588* (2022.01); *G05D 1/0088* (2013.01)

(58) Field of Classification Search
CPC ..... G01S 17/89; G01S 17/931; G05D 1/0214; G05D 1/0221; G05D 1/0223; G05D 1/0242; G05D 1/0248; G05D 1/0251; G05D 1/0274; G05D 1/0088; G05D 2201/0213; G06V 10/143; G06V 10/82; G06V 20/58; G06V 20/582; G06V 20/588; G06F 18/2414; G01C 21/3815; G01C 21/3819; G08G 1/165
See application file for complete search history.

(56) References Cited

U.S. PATENT DOCUMENTS

| | | |
|---|---|---|
| 2011/0123135 A1 | 5/2011 | Hsieh et al. |
| 2017/0343356 A1 | 11/2017 | Roumeliotis et al. |
| 2018/0067494 A1 | 3/2018 | Schiffmann et al. |
| 2018/0225968 A1 | 8/2018 | Wang |
| 2018/0232947 A1* | 8/2018 | Nehmadi ................ G01S 7/295 |
| 2019/0162552 A1* | 5/2019 | Stählin .................. G06F 16/23 |

FOREIGN PATENT DOCUMENTS

| | | |
|---|---|---|
| CN | 108958250 A | 12/2018 |
| CN | 109100741 A | 12/2018 |
| CN | 109341694 A | 2/2019 |
| JP | 2018510373 A | 4/2018 |
| JP | 2020014845 A | 1/2020 |
| KR | 10-2016-0062261 A | 6/2016 |

OTHER PUBLICATIONS

European Communication received from European Patent Office for European Application No. 19817915.2, dated Jul. 14, 2021 (6 pages).
Extended European Search Report received from European Patent Office for European Application No. 19817915.2, dated Nov. 5, 2020 (8 pages).
Communication pursuant to Article 94(3) EPC issued Jul. 12, 2022, in corresponding European Patent Application No. 19 817 915.2.
The First Office Action dated Jul. 31, 2024 for Chinese Application No. 201980018225.0.

* cited by examiner

LOCAL SENSING BASED AUTONOMOUS NAVIGATION, AND ASSOCIATED SYSTEMS AND METHODS

CROSS-REFERENCE TO RELATED APPLICATIONS

This application is a continuation of International Application No. PCT/CN2019/075464 filed Feb. 19, 2019, which is incorporated herein by reference in its entirety.

TECHNICAL FIELD

The present disclosure is directed to autonomous navigation, and more particularly to local, sensing based autonomous motion for mobile platforms.

BACKGROUND

Autonomous vehicles typically rely on access to externally-provided, high-precision maps to perform autonomous driving functions. The external high-precision maps are typically pre-generated from data gathered by other sources, such as data-gathering cars. For example, the data-gathering cars can include stereo cameras that scan the roads along pre-planned routes and gather image data, which can be combined with a high-precision GPS overlay (having positional data) to create a three-dimensional (3D) model of a region, a country, or the world. Based on the 3D model, basic navigation features such as lane markings, navigable areas, or the like can be automatically or semi-automatically labeled, thereby providing basic "true values" for autonomous driving. Relying on the external high-precision maps, the autonomous driving system of a vehicle typically focuses its computational resources on dynamic obstacle detection and tracking, allowing the vehicle to "drive" or otherwise navigate itself. However, reliance on the access to externally-provided maps may have various drawbacks and inflexibilities. Therefore, there exists a need for an improved system of autonomous navigation for mobile platforms

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
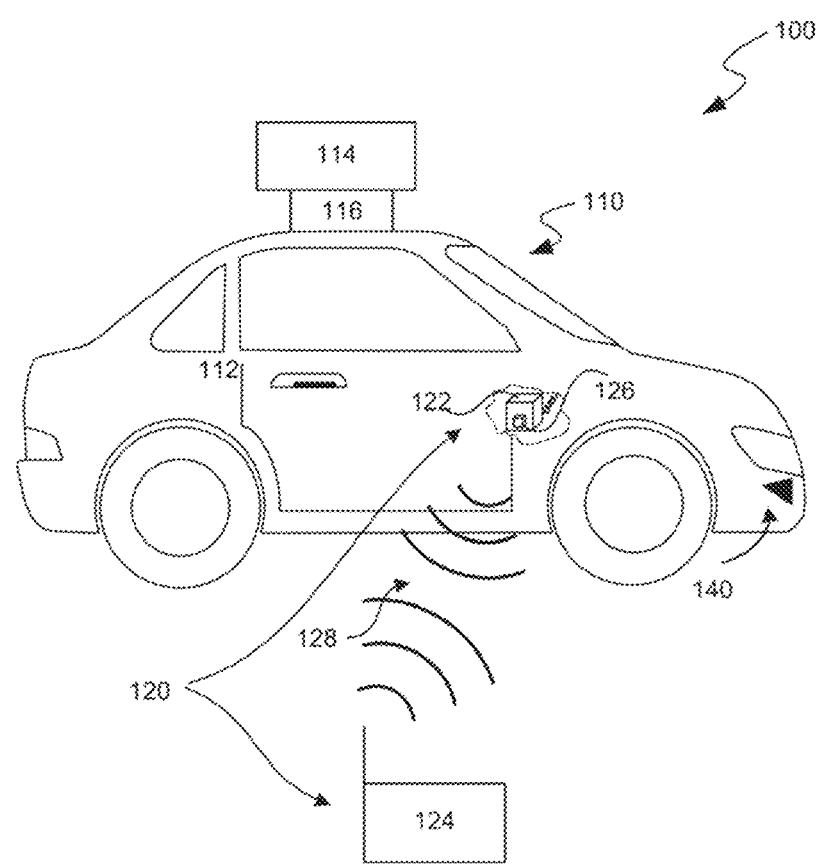
FIG. 1 is a schematic illustration of a representative system having elements configured in accordance with some embodiments of the presently disclosed technology.

Although external high-precision maps and high-precision GPS may provide an autonomous vehicle with data for autonomous driving or other navigation, there are situations in which GPS signals are weak or unwanted, or in which the high-precision maps are not available (e.g. in an indoor environment). These situations can render autonomous navigation dysfunctional or ineffective. Additionally, relying on external high-precision maps has at least the following drawbacks:

1. Producing high-precision maps off-line can be costly, for example, because high-precision data (e.g., with errors limited to a magnitude of centimeters or less) must typically be collected by relatively expensive sensors from numerous sources;

2. Updating and maintaining high-precision maps can be costly, for example, because the maps typically need to be updated and maintained frequently to provide an accurate reflection of the current environment, which is considered "truth" by autonomous vehicles;

3. If the high-precision maps fail (e.g., the maps are not updated in time, not downloaded to or otherwise accessible to the autonomous vehicle), the safety of an autonomous driving system can be seriously affected; and 4. Producing high-precision maps can involve qualification or certification of map providers, which can be complicated given local laws and regulations enforced by different countries and regions.

Generally speaking, some aspects of the presently disclosed technology are directed to integrating navigation features that are locally detected by a mobile platform to form local, high-precision navigation map(s). The local navigation maps can be generated in real-time based partly on high-precision pose information that is locally obtained while the mobile platform is stationary, moving, or otherwise performing various autonomous navigation functions. Some aspects of the presently disclosed technology are directed to using features obtained from external maps as supplemental or reference data (as opposed to "truth" data), to enhance the locally generated navigation maps and/or to assist other autonomous navigation functions of the mobile platform.

Illustratively, the presently disclosed technology provides a method for controlling a mobile platform. In accordance with a representative method, a controller associated with the mobile platform obtains real-time environment information that indicates at least a portion of an environment within a proximity of the mobile platform. For example, the real-time environment information can include depth information that corresponds to a 3D representation of at least a portion of the environment. The real-time environment information can be based on sensor data generated by one or more sensors (e.g., a stereo camera or a LiDAR sensor) carried by the mobile platform.

In accordance with the representative method, the controller can detect navigation features based on sensor data obtained from one or more sensors carried by the mobile platform. These sensors may or may not overlap with the sensor(s) used to generate the real-time environment information. For example, the sensors used for detecting navigation features can include a camera, LiDAR sensor, ultrasonic sensor, or radar. Illustratively, the navigation features detected can include lane lines or markings, edge lines or markings, guide lines or markings, zebra crossings, traffic lights, traffic signs, guideboards, navigable surface or space, still obstacles, or moving obstacles. To detect the navigation features, the controller can apply one or more artificial neural networks (ANNs) and/or other suitable machine learning techniques to the sensor data.

In accordance with the representative method, the controller can integrate information corresponding to the navigation features with the real-time environment information to generate a local navigation map. The information integrating process can include associating a subset of the navigation features with one or more portions of the environment information in real-time. Illustratively, the integrating process can be based on a spatial and/or temporal transformation between or among reference systems associated with (a) the sensor(s) used for the generation of the environment information and (b) the sensor(s) used for the detection of the navigation features. Alternatively or in addition, the information integrating process can be based on an estimated location and/or orientation of the mobile platform that satisfies one or more precision criteria. For example, the localization error of the mobile platform can be limited to a magnitude of centimeters, millimeters, or smaller for an estimated location and/or a magnitude of tenths of a degree, hundredths of a degree, or smaller for an estimated orientation angle. With the local navigation map, the controller can generate one or more navigation commands to at least partially control a motion of the mobile platform.

In some cases, the controller can further obtain additional (e.g., second) navigation features based on a pre-determined navigation map (e.g., an external high-precision map). The controller can determine a location of the mobile platform relative to the pre-determined navigation map, and obtain second navigation features from the pre-determined navigation map within a proximity of the determined location of the mobile platform. In these cases, the controller can additionally integrate the second navigation features with the environment information to generate the local navigation map.

In some cases, the controller can further obtain an action prediction for controlling the mobile platform based on a pre-determined navigation map (e.g., an external low-precision map). The action prediction can include a prediction for lane changing, stopping, or turning within a threshold distance of the mobile platform in a direction it is headed. In these cases, the controller can generate the one or more navigation commands for the mobile platform based on the action prediction, e.g., in addition to the local navigation map.

More specifically, to navigate in an unknown environment, a representative mobile platform can use various sensors to sense its surrounding environment and generate high-precision 3D information (e.g., 3D depth maps, 3D point clouds, or the like) that models the environment. Measurement errors of the high-precision 3D environment information can be limited to a magnitude of centimeters (e.g., 10 centimeters or less), millimeters (e.g., 10 millimeters or less), or smaller (e.g., less than one millimeter). The mobile platform can simultaneously locate itself (e.g., its relative location and/or orientation) within the 3D environment information using pose information obtained from local sensors. Localization errors (e.g., errors for locating the mobile platform within the 3D environment information) can also be limited to a magnitude of centimeters, millimeters, or smaller.

As the mobile platform is navigating, it can continuously update the 3D environment information based on newly-collected sensor data (e.g., new stereo images, new point clouds, or the like). Given limitations of computational resources associated with the mobile platform, the mobile platform can ignore or marginalize sensor data that reflect environment features beyond a certain proximity of the mobile platform's current location. As the 3D environment information is being updated, it can be expressed in or otherwise associated with a local reference system (e.g., a 3D coordinate system) centered on the current location of the mobile platform (or one of its sensors).

Illustratively, to locate the mobile platform within the 3D environment information, a controller associated with mobile platform can determine the poses of applicable sensors carried by the mobile platform. For example, the controller can access pose information provided by an inertial measurement unit (IMU) or wheel odometer(s) carried by the mobile platform.

As another example, the controller can compare a point cloud based on the newly-collected sensor data with the to-be-updated 3D environment information to determine the pose of the sensors. Two representative approaches for achieving this are: a landmark-based approach and a raw-data approach. Landmarks are uniquely identifiable objects in the environment with locations that can be estimated by a sensor. They can be physically distinctive objects such as wi-fi access points, or spatial points with other distinctive characteristics (e.g., colors). Under this approach, the controller can identify landmarks in the newly-collected sensor data and the 3D environment information and then match them to determine the pose. Raw-data approaches, on the other hand, make no assumption that landmarks can be identified, and instead model directly as a function of the location. Optionally, data provided by the IMU and/or odometers can be utilized to further reduce pose error. After the controller obtains the poses of the sensors, it can update the 3D environment information by fusing the newly-collected sensor data (e.g., depth image) into it in accordance with the pose.

Therefore, without depending on any external high-precision maps, embodiments of the presently disclosed technology can enable a mobile platform controller to estimate the change of pose (e.g., with 6 degrees of freedom and high precision) in real-time using, for example, a vision sensor (e.g., a stereo camera), an IMU, and/or wheel odometer(s) carried by the mobile platform. Based on high-precision pose estimation, the presently disclosed technology can provide small pose errors within a proximity (e.g., within 200 to 500 meters) of the mobile platform, and thereby create local navigation maps that can integrate or fuse detected navigation features with high precision. The local high-precision navigation map can include all the information needed for the autonomous navigation, thereby enabling a robust and efficient autonomous navigation system without relying on external high-precision maps.

In accordance with some embodiments, a controller associated with a mobile platform can include multiple layers of functionality. For example, the controller can include a sensor layer, in which many types of sensors can provide depth information for generating 3D environment information. For example, a laser sensor (e.g., a LiDAR sensor) and/or a visual sensor (e.g., a stereo visual camera or RGB-D camera) can be used with the sensor layer. Although the principles of operation of these sensors may vary, they are capable of collecting depth information and/or other 3D information about some portion of the surrounding environment, or at least can provide raw data which can be used to generate such depth or 3D information. When the mobile platform is moving, the onboard sensors can continuously collect depth or 3D information detected from different angles. With the sensor layer, the mobile platform controller can generate 3D environment information (e.g., in the form of point clouds) that models at least a portion of the surrounding environment. The sensor layer can also include other sensors (e.g., an IMU, a GPS sensor, or the like) that can be used in accordance with various embodiments of the presently disclosed technology.

The controller can include a recognition layer, in which the controller can detect or extract navigation features from sensor data obtained from various sensors carried by the mobile platform. As discussed above, the navigation features can include elements related to road conditions, traffic regulations, directional information, obstacles, among others. The controller can implement suitable machine learning techniques, such as Convolutional Neural Networks (CNNs) in the recognition layer. In some embodiments, detecting certain navigation feature(s) can be performed on individual single frames of sensor data. In some embodiments, detecting certain navigation feature(s) can be performed on a sequence of sensor data frames.

The controller can further include an integration layer, in which the controller can integrate detected navigation features (e.g., lane lines or markings, edge lines or markings, guide lines or markings, zebra crossings, traffic lights, traffic signs, guideboards, navigable surface or space, still obstacles, or moving obstacles), temporally and/or spatially, with the 3D environment information, and generate real-time local navigation map(s). With the integration layer, the controller can provide detected navigation features that have a high precision representation relative to a local environment within a proximity of the mobile platform. In some embodiments, all of the detected navigation features are expressed in a local coordinate system associated with the mobile platform (e.g., in the form of a rolling buffer that is updated based on the location and/or orientation of the mobile platform). In some other embodiments, the detected navigation features may be expressed in other suitable coordinate system(s). As discussed above, using the local navigation map, the controller can generate one or more navigation commands to at least partially control a motion of the mobile platform.

Several details describing structures and/or processes that are well-known and often associated with mobile platforms (e.g., autonomous vehicles, UAVs, and/or other types of mobile platforms) and corresponding systems and subsystems, but that may unnecessarily obscure some significant aspects of the presently disclosed technology, are not set forth in the following description for purposes of clarity. Moreover, although the following disclosure sets forth several embodiments of different aspects of the presently disclosed technology, several other embodiments can have different configurations or different components than those described herein. Accordingly, the presently disclosed technology may have other embodiments with additional elements and/or without several of the elements described below with reference to FIGS. 1-10.

FIGS. 1-10 are provided to illustrate representative embodiments of the presently disclosed technology. Unless provided for otherwise, the drawings are not intended to limit the scope of the claims in the present application.

Many embodiments of the technology described below may take the form of computer- or controller-executable instructions, including routines executed by a programmable computer or controller. The programmable computer or controller may or may not reside on a corresponding mobile platform. For example, the programmable computer or controller can be an onboard computer of the mobile platform, or a separate but dedicated computer associated with the mobile platform, or part of a network or cloud-based computing service. Those skilled in the relevant art will appreciate that the technology can be practiced on computer or controller systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any data processor and can include Internet appliances and handheld devices (including palmtop computers, wearable computers, cellular or mobile phones, multi-processor systems, processor-based or programmable consumer electronics, network computers, mini computers and the like). Information handled by these computers and controllers can be presented at any suitable display medium, including an LCD (liquid crystal display). Instructions for performing computer- or controller-executable tasks can be stored in or on any suitable computer-readable medium, including hardware, firmware or a combination of hardware and firmware. Instructions can be contained in any suitable memory device, including, for example, a flash drive, USB (universal serial bus) device, and/or other suitable medium. In particular embodiments, the instructions are accordingly non-transitory.

FIG. 1 is a schematic illustration of a representative system 100 having elements configured in accordance with some embodiments of the presently disclosed technology. The system 100 includes a mobile platform 110 (e.g., an autonomous vehicle) and a control system 120. The mobile platform 110 can be any suitable type of movable object, such as an autonomous vehicle, an unmanned aerial vehicle, or a robot.

The mobile platform 110 can include a main body 112 that can carry a payload (e.g., passengers and/or cargo). The main body 112 can also carry a sensor set 114 including one or more sensors, such as an imaging device and/or an optoelectronic scanning device. For example, the sensor set 114 can include a stereo camera, a mono camera, a video camera, a still camera, and/or a LiDAR sensor. In some embodiments, the sensor set 114 can be used to perform or support functions such as navigation. In still further embodiments, the sensor set 114 can be used to capture images for other purposes, e.g., inspection, real-estate photography, forest fire monitoring, among others.

In some embodiments, the sensor set 114 is supported relative to the main body 112 with a carrying mechanism 116 (e.g., a gimbal, rack, and/or crossbar). The carrying mechanism 116 can allow the sensor set 114 to be independently positioned relative to the main body 112.

The mobile platform 110 can be configured to receive control commands from the control system 120 and/or transmit data to the control system 120. In the embodiment shown in FIG. 1, the control system 120 includes some components carried on the mobile platform 110 and some components positioned off the mobile platform 110. For example, the control system 120 can include a first controller 122 carried by the mobile platform 110 and a second controller 124 (e.g., a human-operated, remote controller such as a remote car key or a smartphone running a controller app) positioned remote from the mobile platform 110 and connected via a communication link 128 (e.g., a wireless link such as a radio frequency (RF) based link, a Wi-Fi network, a cellular network, a Bluetooth based link, and/or other near field communication link). The first controller 122 can include a computer-readable medium 126 that executes instructions directing the actions of the mobile platform 110, including, but not limited to, the mobile platform's motions and operation of the payload 114. The second controller 124 can include one or more input/output devices, e.g., a display and control buttons. In some embodiments, the operator at least partly manipulates the second controller 124 to control the mobile platform 110 remotely, and receives feedback from the mobile platform 110 via the display and/or other interfaces on the second controller 124. In some embodiments, the mobile platform 110 operates autonomously, in which case the second controller 124 can be eliminated, or can be used solely for operator override functions.

In order to provide for safe and efficient operation, it may be beneficial for a mobile platform to be able to autonomously or semi-autonomously detect obstacles and/or to engage in evasive maneuvers to avoid obstacles. Additionally, sensing environmental objects can be useful for mobile platform functions such as navigation, target tracking, and mapping, particularly when the mobile platform is operating in a semi-autonomous or fully autonomous manner.

The mobile platforms described herein can include one or more sensors (e.g., separate and independent from the sensor set 114) configured to detect objects in the environment surrounding the mobile platform. In some embodiments, the mobile platform includes one or more sensors (e.g., distance measurement device 140 of FIG. 1) configured to measure the distance between an object and the mobile platform. The distance measurement device can be carried by the mobile platform in various ways, such as above, underneath, on the side(s) of, or within the main body of the mobile platform. Optionally, the distance measurement device can be coupled to the mobile platform via a gimbal or other carrying mechanism that permits the device to be translated and/or rotated relative to the mobile platform. In some embodiments, the distance measurement device can include an optical distance measurement device that uses light to measure distance to an object. In some embodiments, the distance measurement device is a stereo vision system that can provide stereo visual data, from which depth information can be determined. The stereo vision system can be stereo camera(s). In some embodiments, the distance measurement device can include a LiDAR system, a radar system, or a laser rangefinder.

Figure 10:
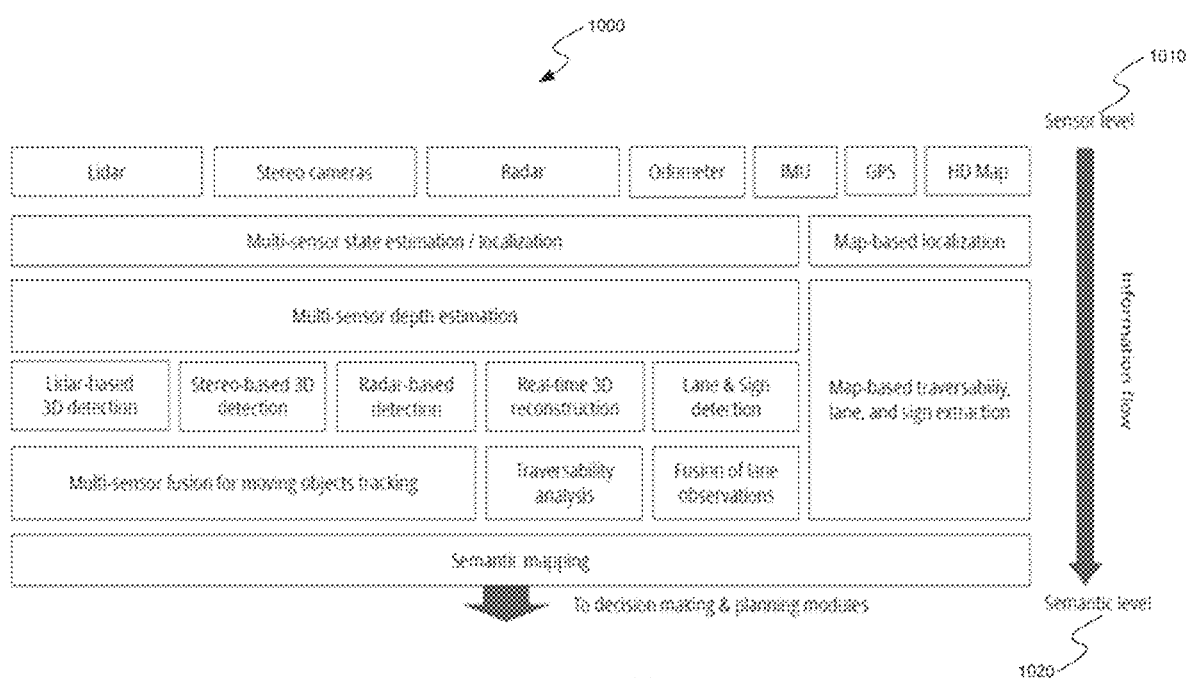
FIG. 10 illustrates an example architecture implemented on the system of FIG. 1, in accordance with some embodiments of the presently disclosed technology.

FIG. 10 illustrates an example architecture 1000 implemented on the mobile platform of FIG. 1, in accordance with some embodiments of the presently disclosed technology. Illustratively, the architecture 1000 can include multiple layers of functionality, some of which implemented via a controller (e.g., an onboard computer of the mobile platform, an associated computing device, and/or an associated computing service).

With reference to FIG. 10, the architecture 1000 can include a sensor layer 1010, which can include access to various sensors (e.g., LiDAR, stereo cameras, radar, odometer, IMU, GPS, or the like) carried by the mobile platform. In some embodiments, the sensor layer can also include access to external map(s) (e.g., external high-precision maps). The architecture 1000 can include multiple functional modules that perform various types of estimation, detection, localization, fusion, or other analysis based on direct or indirect data access to the sensor layer. For example, distinct modules can perform multi-sensor state estimation and/or localization, multi-sensor depth estimation, map-based localization, LiDAR-based 3D detection, stereo-based 3D detection, radar-based detection, real-time 3D reconstruction, lane and sign detection, map-based traversability, lane, and sign extraction, multi-sensor fusion for moving objects tracking, traversability analysis, fusion of lane observations, or the like. Illustratively, an example of local navigation map can be generated by the modules that perform multi-sensor fusion for moving objects tracking, traversability analysis, and fusion of lane observations. The architecture 100 can further include a semantic layer 1020, which can include a semantic mapping module for mapping module generated results to semantic values or representations that can feed into higher level navigation modules (e.g., for mobile platform maneuver decision making and/or route planning).

Figure 2:
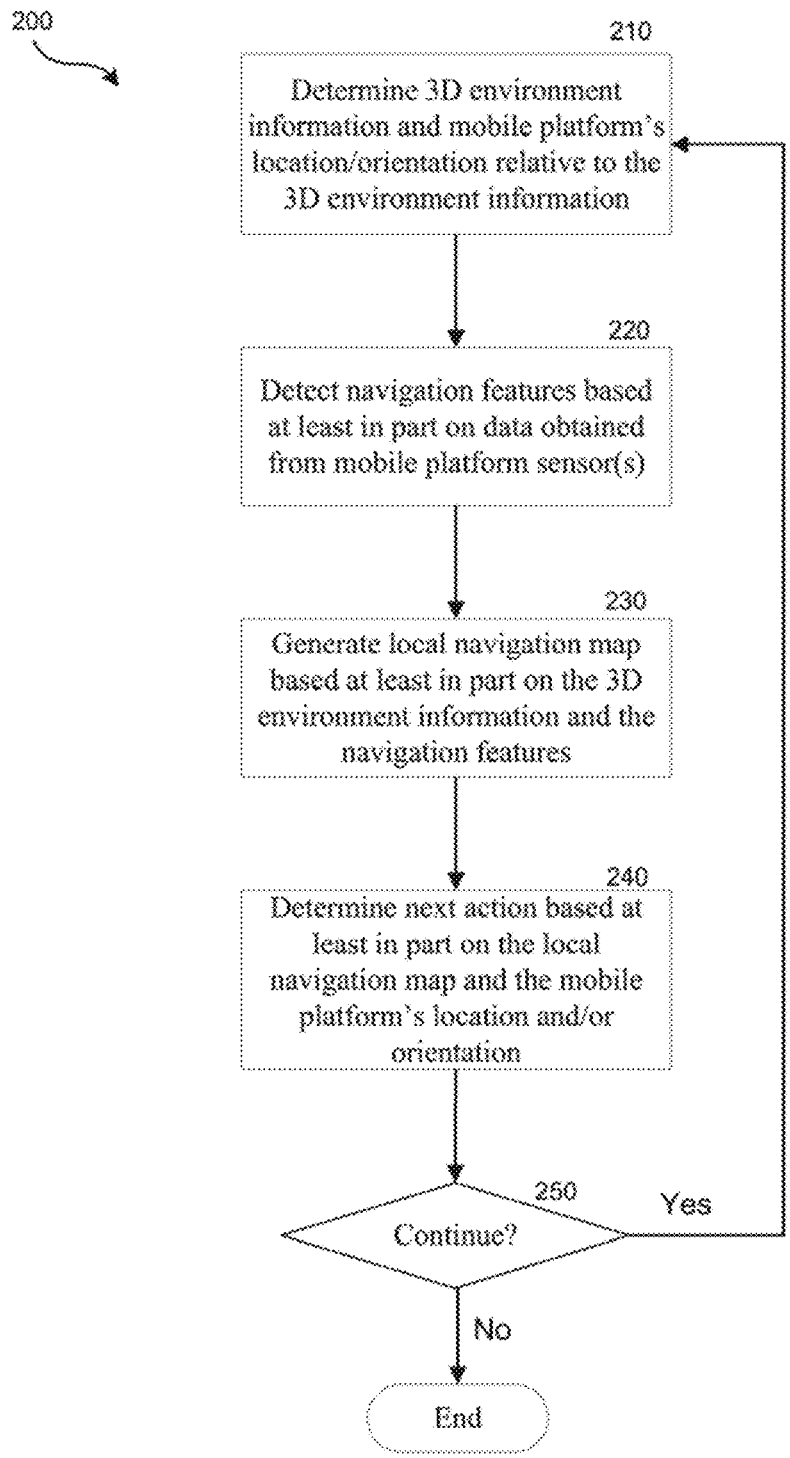
FIG. 2 is a flowchart illustrating a method for autonomous navigation based on a local navigation map, in accordance with some embodiments of the presently disclosed technology.

FIG. 2 is a flowchart illustrating a method 200 for autonomous navigation based on a local navigation map, in accordance with some embodiments of the presently disclosed technology. The method 200 can be implemented by a controller (e.g., an onboard computer of a mobile platform, an associated computing device, and/or an associated computing service).

With reference to FIG. 2, at block 210, the method 200 includes determining (a) three-dimensional (3D) environment information that indicates at least a portion of an environment within a proximity of the mobile platform and (b) a location and/or orientation of the autonomous vehicle relative to the 3D environment information. In some embodiments, the determining is performed in real time.

Figure 5:
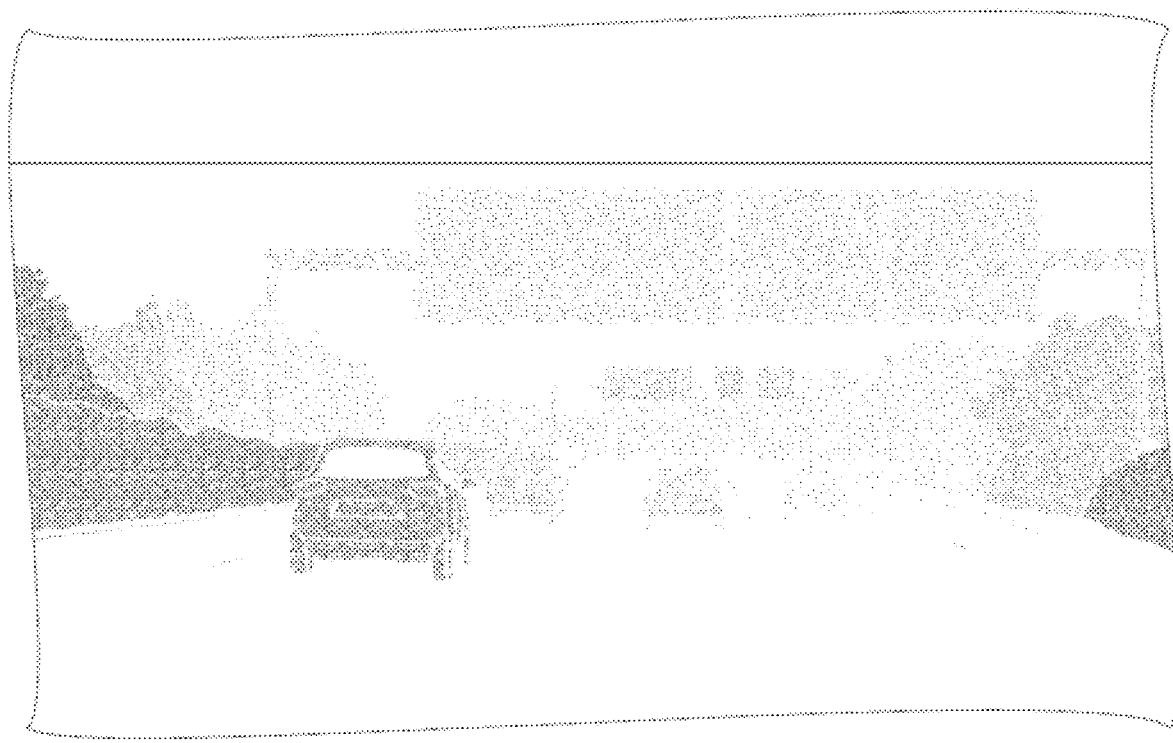
FIG. 5 shows an example representation of 3D environment information in point cloud form, in accordance with some embodiments of the presently disclosed technology.

Illustratively, determining the 3D environment information can be based, on a visual sensor (e.g., a stereo camera), LiDAR, or radar carried by the mobile platform. For example, stereo images produced by a stereo camera can be used to generate high-precision 3D environment information that models at least part of the environment surrounding the mobile platform (e.g., toward the direction where the mobile platform is headed). The 3D environment information can be expressed and/or formatted in various ways. For example, the 3D information can be in a form of 3D point cloud(s), 3D mesh(es), Signed Distance Fields, or the like. Measurement errors of the high-precision 3D environment information can be limited to a magnitude of centimeters, millimeters, or smaller. This can be achieved, for example, by using LiDAR, stereo camera(s), and/or other sensors that satisfy certain precision requirements and only incorporating sensor data that correspond to measurements within a certain proximity of the mobile platform into the 3D environment information. As the mobile platform is navigating, it can continuously update the 3D environment information based on newly-collected sensor data (i.e., new stereo images, new point clouds, or the like). Given the limitations of computational resources associated with the mobile platform, the controller can skip or marginalize sensor data which reflect environment features beyond a certain proximity to the mobile platform's current location. FIG. 5 shows an example representation of at least a portion of the 3D environment information in point cloud form, in accordance with some embodiments of the presently disclosed technology.

Referring back to FIG. 2, substantially concurrently with creating and/or updating the 3D environment information, the controller can locate the mobile platform (e.g., its relative location and/or orientation) within the 3D environment information using pose information obtained from sensor(s) carried by the mobile platform. In other words, the operation of creating and/or updating of the 3D environment information and the operation of locating of the mobile platform can overlap in time. This process can generally be referred to as localization. Illustratively, the controller can locate the mobile platform by accessing data provided by an IMU, wheel odometer, visual sensor, and/or other sensors carried by the mobile platform. For example, the controller can compare a point cloud generated from newly-collected sensor data with existing, yet-to-be-updated 3D environment information (e.g., a point cloud based on previously collected sensor data) to determine the pose of the sensor(s)/mobile platform. Two representative approaches for achieving this end include a landmark-based approach and a raw-data approach. Landmarks are uniquely identifiable objects in the environment whose location can be estimated by a sensor. They can be physically distinctive objects such as wi-fi access points, or features points residing in the environment with other distinctive characteristics (e.g., colors). Under this approach, the controller can identify (e.g., using applicable pattern recognition techniques) landmarks in both the newly-collected sensor data and the existing 3D environment information and then match them to determine current pose (e.g., the relative rotation and/or translation between coordinate systems associated the existing 3D environment information and the newly-collected sensor data in order to achieve the matching of landmarks). Raw-data approaches, on the other hand, make no assumption that landmarks can be identified, and instead model the newly collected sensor data directly as a function of the new orientation and/or location. Optionally, data provided by the IMU, odometer(s), and/or other sensors can be utilized to further reduce pose error. Localization errors (e.g., errors for locating the mobile platform within the 3D environment information) can also be limited to a magnitude of centimeters, millimeters, or smaller. These precisions can be achieved at least partly because the 3D environment information is obtained with high precision (e.g., with errors limited to a magnitude of tens of centimeters, centimeters, or less) and limited to a certain proximity (e.g., hundreds of meters, tens of meters, meters, or less) from the mobile platform. After the controller obtains the pose(s) of the sensor(s), it can update the 3D environment information by fusing the newly-collected sensor data (e.g., depth data) into it in accordance with the pose(s). For example, new point clouds generated based on the newly-collected sensor data can be merged with existing 3D environment information (e.g., in point cloud form) after rotational and/or translational transformations based on the pose(s). As part of the updating process, the 3D environment information can be expressed in or associated with a local reference system (e.g., 3D coordinate system) centered on the current location of the mobile platform.

With continued reference to FIG. 2, at block 220, the method 200 includes detecting navigation features (e.g., lane lines, edge lines, guide lines, zebra crossings, traffic lights, traffic signs, guideboards, navigable surface or space, still obstacles, or moving obstacles) based, at least in part, on sensor data obtained from one or more sensors carried by the mobile platform. Illustratively, the controller can access sensor data obtained from various sensors (e.g., a LiDAR sensor, camera, radar, ultrasonic sensor, or the like) carried by the mobile device to detect the navigation features. The sensors used for navigation feature detection may or may not overlap with the sensors used for determining 3D environment information. For example, in a cost-sensitive system, the sensors used for navigation feature detection can be the same (or a subset of) sensors used for determining 3D environment information. As another example, sensor(s) not used for determining 3D environment information can provide additional data for navigation feature detection, therefore enhancing the performance and robustness of autonomous navigation.

As discussed above, the navigation features can include elements related to road conditions, traffic regulations, directional information, obstacles, or the like. The controller can implement suitable machine learning or other object detection techniques to analyze the sensor data and extract the navigation features (e.g., their type, content, size, boundary, location, or the like). For example, Selective Search object detectors, Region-based Convolutional Neural Networks (R-CNNs), Fast R-CNNs, or the like can be used to achieve navigation feature detection. In some embodiments, detecting certain navigation feature(s) can be performed on individual single frames of sensor data. In some embodiments, detecting certain navigation feature(s) can be performed on a sequence of sensor data frames.

Use lane markings as an example, for each frame of image data (or point cloud data), pixels in the image (or points in the point cloud) that correspond to lane markings are detected. Optionally, the controller can then perform a 2D to 3D (or 3D to 3D) position transformation of the detected markings as appropriate. The controller can further implement suitable lane fitting algorithms to link lane markings and represent them in lane segments for tracing multiple parallel lanes.

Figure 6:
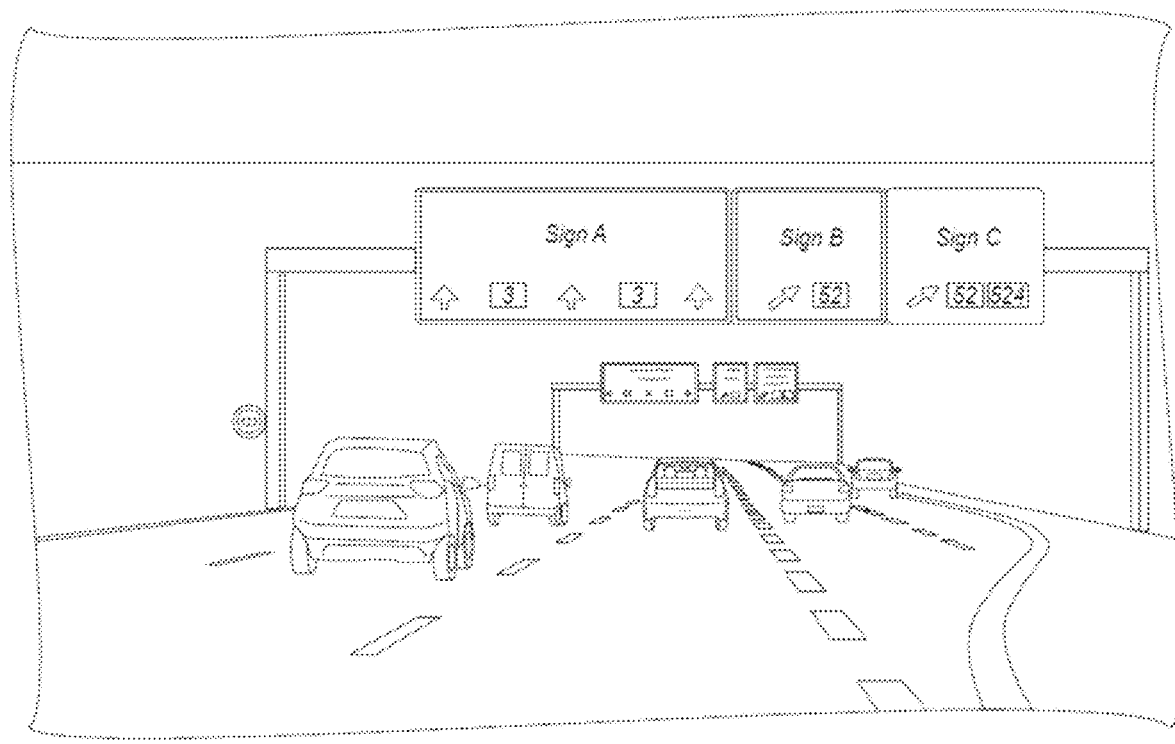
FIG. 6 shows an example of sensor data obtained from a sensor carried by a mobile platform, in accordance with some embodiments of the presently disclosed technology.

FIG. 6 shows an example of sensor data (e.g., a frame of image) obtained from a sensor (e.g., a camera) carried by the mobile platform, in accordance with some embodiments of the presently disclosed technology. The sensor data obtained from the sensor can overlap, at least partially, with the 3D environment information illustrated in FIG. 5. That is, they can include representation of a same portion of the environment surrounding the mobile platform. In various embodiments, the format of the sensor data may or may not differ from the format of the 3D environment information.

Illustratively, the image as shown in FIG. 6 can be a single frame of image captured by a front-facing camera carried by the mobile platform. The image shows the environment where the mobile platform is headed and/or needs to navigate through. The image may or may not have depth information (e.g., if generated by a stereo camera).

Figure 7:
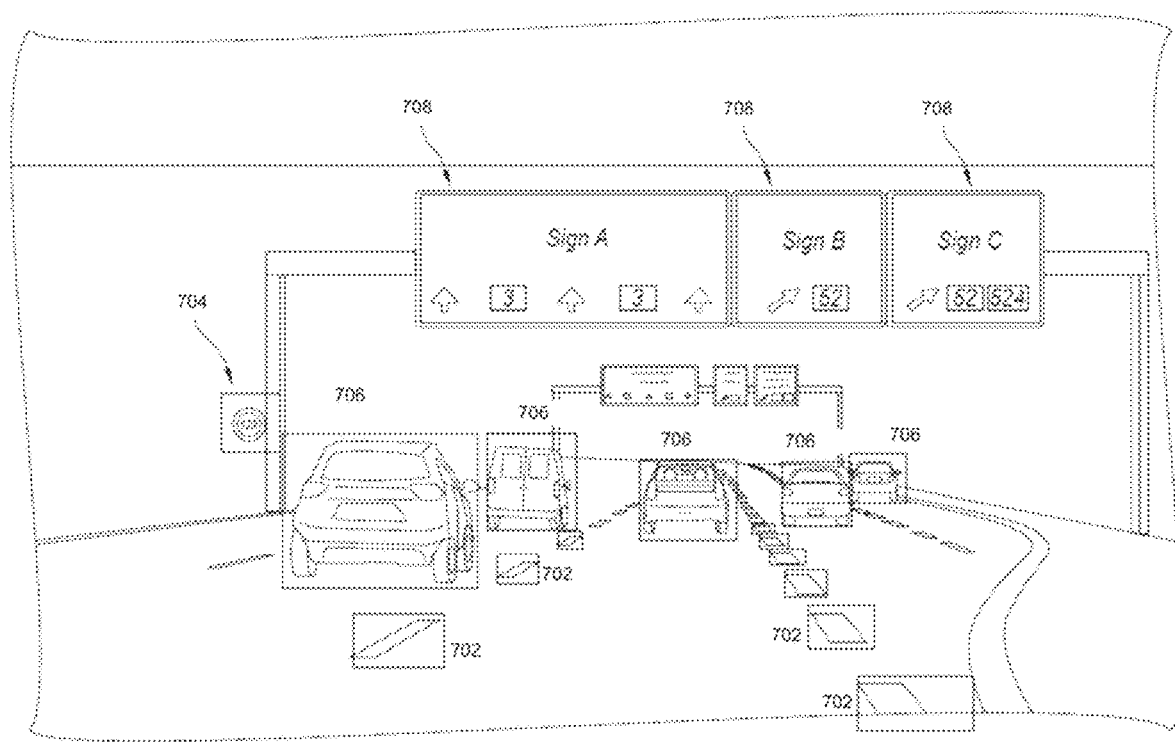
FIG. 7 shows an example of navigation features that are detected from the sensor data of FIG. 6, in accordance with some embodiments of the presently disclosed technology.

FIG. 7 shows an example of navigation features (e.g., lane markings, direction guideboards, speed limit sign, moving vehicles) that are detected from the sensor data of FIG. 6, in accordance with some embodiments of the presently disclosed technology. Illustratively, by analyzing a single frame of image as shown in FIG. 6, the controller can detect lane markings 702, speed limit 704, moving obstacles 706, and direction signs 708 using applicable pattern recognition and/or machine learning techniques. In some embodiments, the controller may not be able to detect every possible navigation feature using the sensor data of FIG. 6 alone. For example, the controller may decide to only confirm detection of a navigation feature if a confidence level associated with the detection is higher than a threshold. In some embodiments, the controller can use a combination of sensor data collected from different sensors to detect more navigation features.

Referring back to FIG. 2, at block 230, the method 200 includes generating a local navigation map based, at least in part, on the 3D environment information and the detected navigation features. Illustratively, the controller can integrate detected navigation features, temporally and/or spatially, with the 3D environment information in real time. The controller can provide detected navigation features with a high-precision representation relative to a local environment within a proximity of the mobile platform. In some embodiments, all of the detected navigation features are expressed in a local reference system associated with the mobile platform (e.g., in the form of a rolling buffer that is updated based on the location and/or orientation of the mobile platform).

Illustratively, for each frame of sensor data, the pose (e.g., location and/or orientation) of the mobile platform (or sensor(s)) can be estimated as discussed above with reference to block 210. Based on the pose information, the controller can determine transformations (e.g., translational and/or rotational) between reference systems associated with the detected navigation features and the current 3D environment information. The controller can then project the detected navigation features onto the 3D environment information to generate the local navigation map.

As a more specific example, for each frame of image generated from a camera carried by the mobile platform, the controller can identify pixel positions of lane markings in the image (e.g., based on region-based convolutional neural networks (R-CNN), Fast R-CNN, Faster R-CNN, and/or other suitable algorithms or methods). Using suitable depth estimation algorithm(s) (e.g., semi-global matching and mutual information methods, multi-scale deep network based methods, and/or other suitable algorithms or methods), the controller can calculate depth information of lane marking pixels. The controller can further calculate three-dimensional (3D) coordinates of identified lane marking pixels relative to the camera.

Given 3D coordinates (x, y, z) of lane markings, the controller can project lane markings into a two-dimensional (2D) birds-eye view space (x', y') using the following projection formulae:

$$x' = s_x * x + c_x$$

$$y' = s_y * y + c_y$$

where vectors $s_x$ and $s_y$ are scale factors, and scalars $c_x$ and $c_y$ are offsets. These constants are optional and can be predetermined. For example, the values of $s_x$, $s_y$, $c_x$ and $c_y$ can be set in a way that properly aligns the view point of the birds-eye view space.

The controller can then group the lane markings and curve-fitting the lane markings belonging to different groups to obtain structured lane line(s), which can be projected onto the 3D environment information as part of the local navigation map.

As another specific example, for each frame of image generated from a camera carried by the mobile platform, the controller can identify pixel positions of traffic signs (e.g., specifying speed limits, traffic rules, directions, or the like) from the image (e.g., based on region-based convolutional neural networks (R-CNN), Fast R-CNN, Faster R-CNN, and/or other suitable algorithms or methods). Using suitable depth estimation algorithm(s) (e.g., semi-global matching and mutual information methods, multi-scale deep network based methods, and/or other suitable algorithms or methods), the controller can calculate depth information of traffic sign pixels. The controller can further calculate three-dimensional (3D) coordinates of identified traffic pixels relative to the camera. Given the 3D coordinates of traffic sign pixels, the controller can project traffic signs into the two-dimensional (2D) top view space in a way similar to the lane line projection describe above.

In order to eliminate or mitigate mis-identifications, the controller can use the mobile platform's location and/or orientation information associated with each frame of image to perform a weighted, temporal accumulation of the identified traffic sign(s). Illustratively, Kalman filters, octrees, probabilistic multi-hypothesis tracking methods, and/or other suitable algorithms or methods can be used to perform the temporal accumulation and a confidence level of whether or not there is a sign detected at a position. Illustratively, let the confidence levels before and after an update be $z_{n-1}$ and $z_n$, respectively, the update weight be w, and the current observation be z, then the confidence update formula for the sign being detected at the current position can be:

$$z_n = w*z + (1-w)*z_{n-1}$$

The controller can project the traffic sign(s) onto the 3D environment information and associate them with their respective confidence levels that are updated as the mobile platform keeps on moving, as part of the local navigation map.

With continued reference to FIG. 2, at block 240, the method 200 includes determining a next action for the mobile platform based, at least in part, on the local navigation map and the mobile platform's location and/or orientation. As discussed above, the local high-precision navigation map can include all the information needed to autonomously navigate the mobile platform, and therefore enable the controller to generate one or more commands (e.g., stop, accelerate, decelerate, left turn, right turn, or the like) that at least partially control a motion of the mobile platform without relying on external maps.

For example, given the identified lane lines in the local navigation map, the mobile platform can perform lane-keeping operations. As another example, given identified speed limits in the local navigation map, the mobile platform can perform speed control operations. As yet another example, given the identified static and/or moving objects in the local navigation map, the mobile platform can perform obstacle avoidance operations.

As will be discussed in more detail with FIGS. 3 and 4, in some embodiments, the controller can obtain features from external maps as supplemental or reference data (as opposed to "truth" data), to enhance the locally generated navigation maps and/or to assist other autonomous navigation functions of the mobile platform.

At block 250, the method 200 includes determining whether to continue updating the local navigation map and performing autonomous navigation. If the controller determines to continue the process, the method 200 proceeds back to block 210. Otherwise, the method 200 ends.

Figure 3:
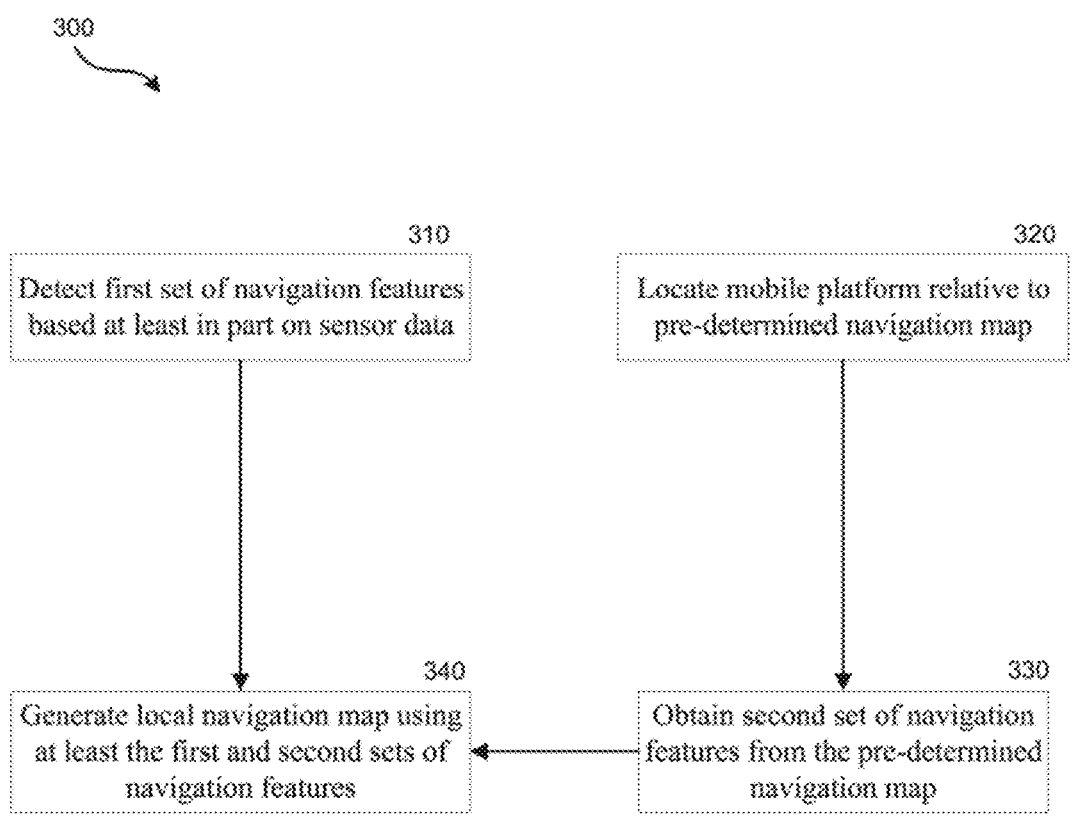
FIG. 3 is a flowchart illustrating a method for generating a local navigation map based on local sensor data and a pre-determined navigation map, in accordance with some embodiments of the presently disclosed technology.

FIG. 3 is a flowchart illustrating a method 300 for generating a local navigation map based on local sensor data and a pre-determined navigation map, in accordance with some embodiments of the presently disclosed technology. The method 300 can be implemented by a controller (e.g., an onboard computer of a mobile platform, an associated computing device, and/or an associated computing service).

With reference to FIG. 3, at block 310, the method 300 includes detecting a first set of navigation features based, at least in part, on data obtained from sensors carried by the mobile platform. Illustratively, this can be achieved in a manner similar to that described with reference to blocks 210 and 220 of FIG. 2.

At block 320, the method includes locating the mobile platform relative to a pre-determined navigation map. Illustratively, the pre-determined navigation map can be an external high-precision map (e.g., a high definition (HD) map with a precision error of 10 cm or less) accessible to the controller. To locate the mobile platform relative to the pre-determined navigation map, the controller can apply global localization methods or other suitable localization techniques. Illustratively, the locating process can be based on Iterative Closest Point (ICP) algorithms that aim to find the transformation between two reference systems (e.g., one associated with the mobile platform and the other associated with the pre-determined navigation map), by minimizing the square errors.

At block 330, the method includes obtaining a second set of navigation features from the pre-determined navigation map in accordance with the mobile platform's location relative to the map. Illustratively, given the mobile platform's relative location, the controller can search and retrieve navigation features that are included with the pre-determined navigation map and within a proximity (e.g., 200 to 500 meters) of the mobile platform's location on the map.

At block 340, the method includes generating a local navigation map using at least the first and second sets of navigation features. Illustratively, both the first and second set of navigation features can be projected to the 3D environment information that is generated/updated based on sensor data obtained from the mobile platform's local sensors. In some embodiments, at least some of the second set of navigation features do not overlap with the first set. The controller can decide to assign different weights to both sets and combine their projections. In some embodiments, conflicting information may arise between the first and second sets of navigation features, and the controller can decide to only use the first set of features or at least skip certain features from the second set because they may be out of date or otherwise inaccurate. In some embodiments, the controller can project all the navigation features from first set but only a subset of navigation features from the second set that are complementary (e.g., in terms of feature type) to the first set.

Therefore, the local navigation map can serve as a safety redundancy mechanism for autonomous navigation. When external or other predetermined HD map(s) are available, the HD map(s) can be merged into the local navigation map as a form of sensor data. When the external or other predetermined HD map(s) provide information that is in conflict or otherwise inconsistent with that of the local navigation map, the controller can use the local navigation map for autonomous navigation, thereby providing improvements in navigation safety.

With features from external maps as supplemental or reference data (as opposed to "truth" data), the local navigation map can be more comprehensive and reliable for autonomous navigation.

Figure 4:
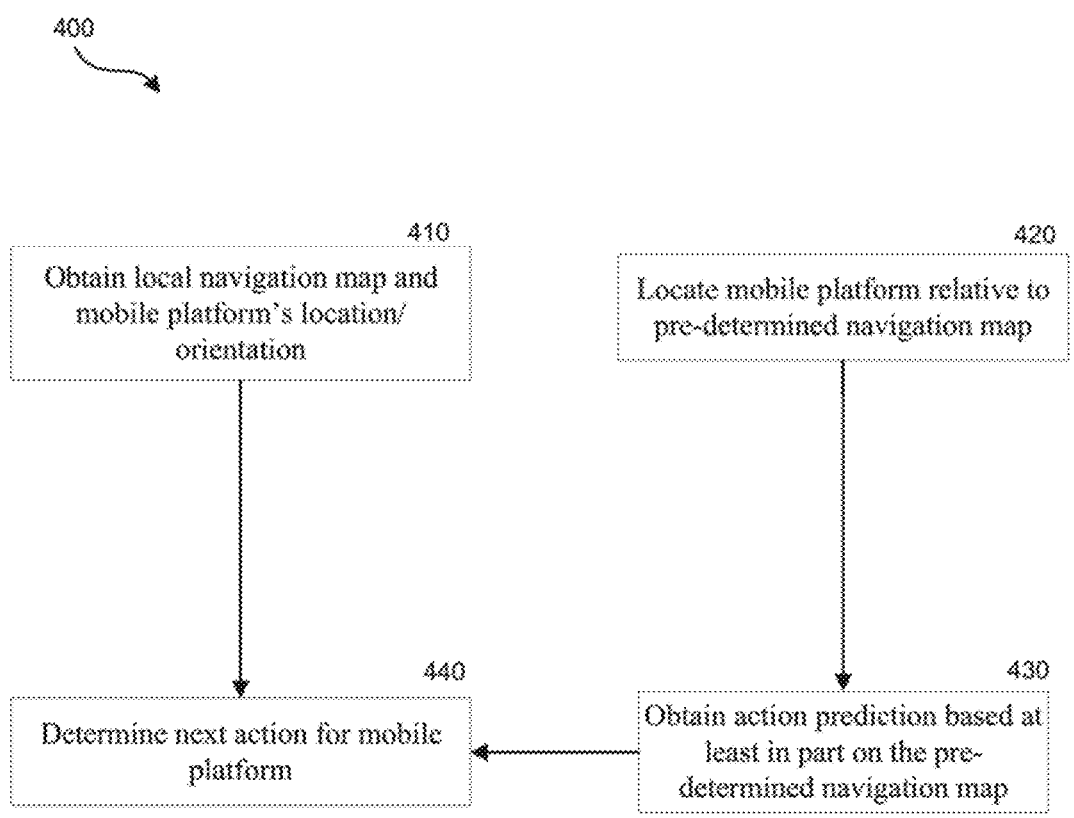
FIG. 4 is a flowchart illustrating a method for determining actions for a mobile platform based on a local navigation map and a pre-determined navigation map, in accordance with some embodiments of the presently disclosed technology.

FIG. 4 is a flowchart illustrating a method 400 for determining actions for a mobile platform based on a local navigation map and a pre-determined navigation map, in accordance with some embodiments of the presently disclosed technology. The method 400 can be implemented by a controller (e.g., an onboard computer of a mobile platform, an associated computing device, and/or an associated computing service).

With reference to FIG. 4, at block 410, the method 400 includes obtaining (1) a local navigation map generated based on sensor data obtained from sensor(s) carried by the mobile platform and (2) the mobile platform's location and/or orientation. Illustratively, this can be achieved in a manner generally similar to that described with reference to blocks 210, 220, and 230 of FIG. 2.

At block 420, the method includes locating the mobile platform relative to a pre-determined navigation map. Illustratively, the pre-determined navigation map can be an external low-precision map (e.g., a standard definition (SD) map with a precision error of 5 m or more) accessible to the controller. The controller can locate the mobile platform relative to the pre-determined navigation map in a manner generally similar to what has been described with reference to block 320 of FIG. 3. In some embodiments, the controller may not need a precise localization of the mobile platform with respect to the pre-determined navigation map as long as certain navigation instructions (e.g., "take a left lane change in 300 meters") can be retrieved from the pre-determined navigation map.

At block 430, the method includes obtaining an action prediction based, at least in part, on the pre-determined navigation map. Illustratively, given the mobile platform's relative location and/or orientation and a target destination or direction, the controller can search the pre-determined navigation map for navigation instructions. The navigation instructions can include predictions for lane changing, stopping, or turning within a threshold distance of the mobile platform in a direction it is headed. Because the pre-determined navigation map may not have a high precision and/or the mobile platform's relative location and/or orientation may not be precise, not all of the navigation instructions are useful predictions. Some of the navigation instructions that predict an action beyond a threshold distance or time can be obtained and considered by the controller.

At block 440, the method includes determining a next action for the mobile platform based on the local navigation map and the action prediction retrieved form the pre-determined navigation map. For example, the action prediction retrieved from the pre-determined navigation map is "take a right turn in 400 meters" and the pre-determined navigation map has an error of about +/−50 meters. In this case, the controller can locate the relevant road topology (e.g., a crossroads for the predicted right turn) in the local high-precision navigation map, and make sure that the mobile platform is driving on the right lane of the road in order to detect the crossroads as it comes up. When the right turn detection is successful, the controller can issue a "right turn" command to control the mobile platform for completion of the turn. Accordingly, the fidelity of the mobile platform maneuver can be improved to the order of centimeters, millimeters, or less, rather than tens of meters.

Accordingly, with features obtained from external maps as supplemental or reference data (as opposed to "truth"

data), the controller can enhance the locally generated navigation maps and/or assist other autonomous navigation functions of the mobile platform.

The following is a non-exhaustive list of additional examples of the presently disclosed technology.

1. A computer-implemented method for controlling an autonomous vehicle, comprising:
    determining (a) three-dimensional (3D) environment information that indicates at least a portion of an environment within a proximity of the autonomous vehicle and (b) a location and/or orientation of the autonomous vehicle relative to the 3D environment information in real time, based, at least in part, on data obtained from a visual sensor and an inertial sensor carried by the autonomous vehicle;
    detecting navigation features including at least one of a lane line, edge line, guide line, zebra crossing, traffic light, traffic sign, guideboard, navigable surface or space, still obstacle, or moving obstacle based, at least in part, on sensor data obtained from one or more sensors carried by the autonomous vehicle;
    integrating information corresponding to the navigation features with at least the 3D environment information to generate a local navigation map;
    determining an action for the autonomous vehicle based, at least in part, on (a) the generated local navigation map and (b) the determined location and/or orientation of the autonomous vehicle; and
    causing the autonomous vehicle to move in accordance with the determined action.

2. The method of example 1, wherein the one or more sensors include at least one of the visual sensor or inertial sensor.

3. A computer-implemented method for controlling a mobile platform, comprising:
    obtaining real-time environment information that indicates at least a portion of an environment within a proximity of the mobile platform based, at least in part, on data received from a first sensor carried by the mobile platform;
    detecting navigation features based, at least in part, on sensor data obtained from at least one of the first sensor or a second sensor carried by the mobile platform;
    integrating information corresponding to the navigation features with at least the environment information to generate a local navigation map; and
    generating one or more navigation commands for at least partially controlling a motion of the mobile platform based, at least in part, on the generated local navigation map.

4. The method of example 3, wherein the environment information includes depth information.

5. The method of example 3, wherein the environment information corresponds to a 3D representation of the at least a portion of environment within a proximity of the mobile platform.

6. The method of example 3, wherein the first sensor includes at least one of a LiDAR sensor or a stereo camera.

7. The method of example 3, wherein the second sensor includes at least one of a camera, LiDAR sensor, ultrasonic sensor, or radar.

8. The method of example 3, wherein the navigation features include at least one of a lane marking, edge line, guide line, zebra crossing, traffic light, traffic sign, guideboard, navigable surface or space, still obstacle, or moving obstacle.

9. The method of example 3, wherein detecting navigation features is based, at least in part, on applying one or more artificial neural networks to the sensor data.

10. The method of example 3, wherein integrating information corresponding to the navigation features with at least the environment information comprises associating at least a subset of the navigation features with one or more portions of the environment information.

11. The method of example 3, wherein integrating information corresponding to the navigation features with at least the environment information is performed in real-time.

12. The method of example 3, wherein integrating information corresponding to the navigation features with at least the environment information is based, at least in part, on a spatial and/or temporal transformation between reference systems associated with at least two sensors carried by the mobile platform.

13. The method of example 3, wherein integrating information corresponding to the navigation features with at least the environment information is based, at least in part, on an estimated location and/or orientation of the mobile platform.

14. The method of example 13, wherein the estimated location and/or orientation satisfies one or more precision criteria.

15. The method of example 3, wherein the navigation features are first navigation features and wherein the method further comprises obtaining second navigation features based, at least in part, on at least one pre-determined navigation map.

16. The method of example 15, further comprising determining a location of the mobile platform relative to the pre-determined navigation map.

17. The method of example 16, further comprising obtaining the second navigation features from the pre-determined navigation map within a proximity of the determined location of the mobile platform.

18. The method of example 15, further comprising integrating the second navigation features with at least the environment information to generate the local navigation map.

19. The method of example 3, further comprising obtaining an action prediction for controlling the mobile platform based on a pre-determined navigation map.

20. The method of example 19, wherein the action prediction includes a prediction for at least one of lane changing, stopping, or turning within a threshold distance of the mobile platform.

21. The method of example 19, wherein generating one or more navigation commands is further based on the action prediction.

22. The method of example 3, wherein the mobile platform includes at least one of an unmanned aerial vehicle (UAV), a manned aircraft, an autonomous car, a self-balancing vehicle, or a robot.

23. A non-transitory computer-readable medium storing computer-executable instructions that, when executed, cause one or more processors associated with a mobile platform to perform any of the example methods 1-22.

24. A vehicle including a controller programmed to at least partially control one or more motions of the vehicle, wherein the programmed controller includes one or more processors configured to perform any of the example methods 1-22.

Figure 8:
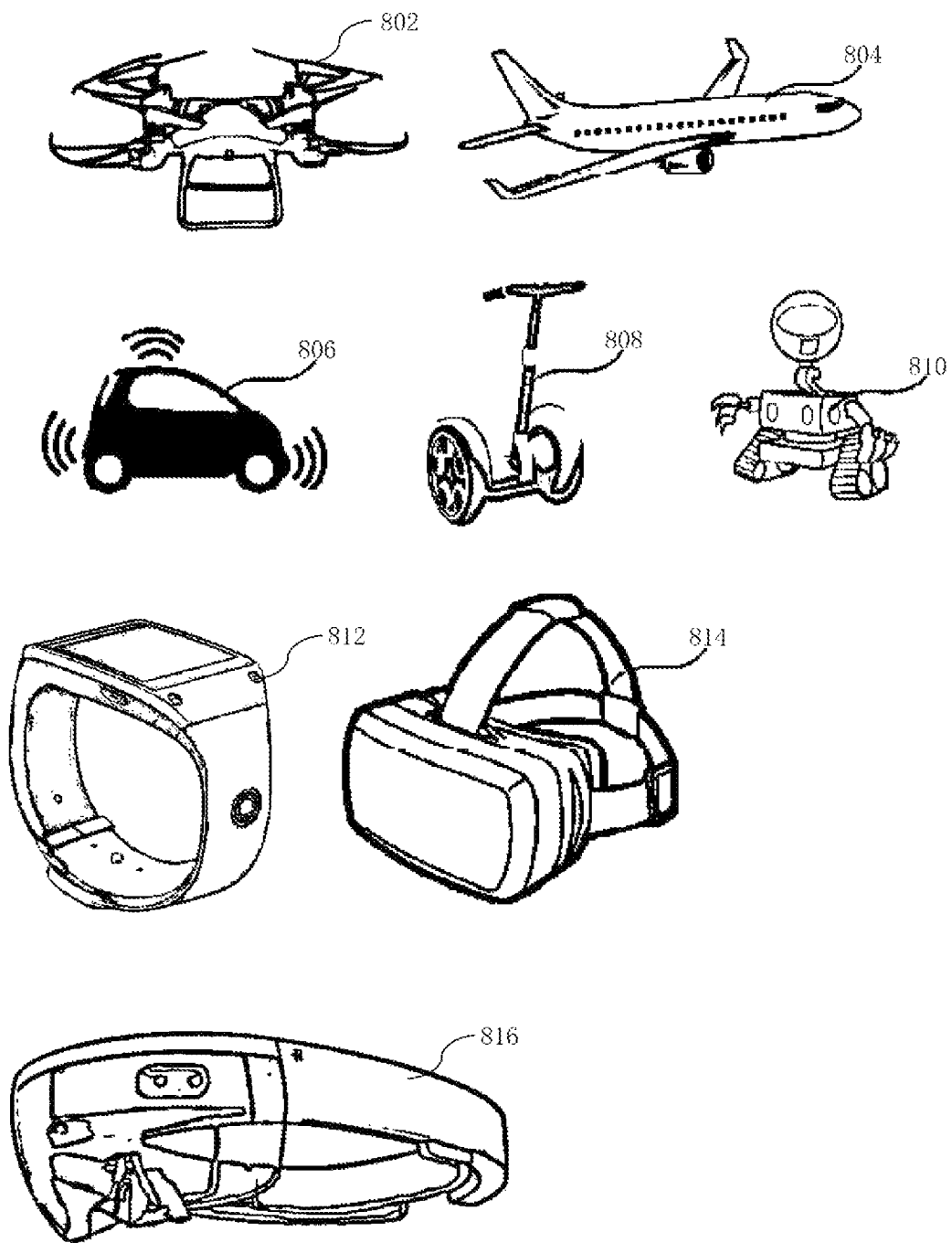
FIG. 8 illustrates examples of mobile platforms configured in accordance with various embodiments of the presently disclosed technology.

FIG. 8 illustrates examples of mobile platforms configured in accordance with various embodiments of the presently disclosed technology. As illustrated, a representative mobile platform as disclosed herein may include at least one of an unmanned aerial vehicle (UAV) 802, a manned aircraft 804, an autonomous vehicle 806, a self-balancing vehicle 808, a terrestrial robot 810, a smart wearable device 812, a virtual reality (VR) head-mounted display 814, or an augmented reality (AR) head-mounted display 816.

Figure 9:
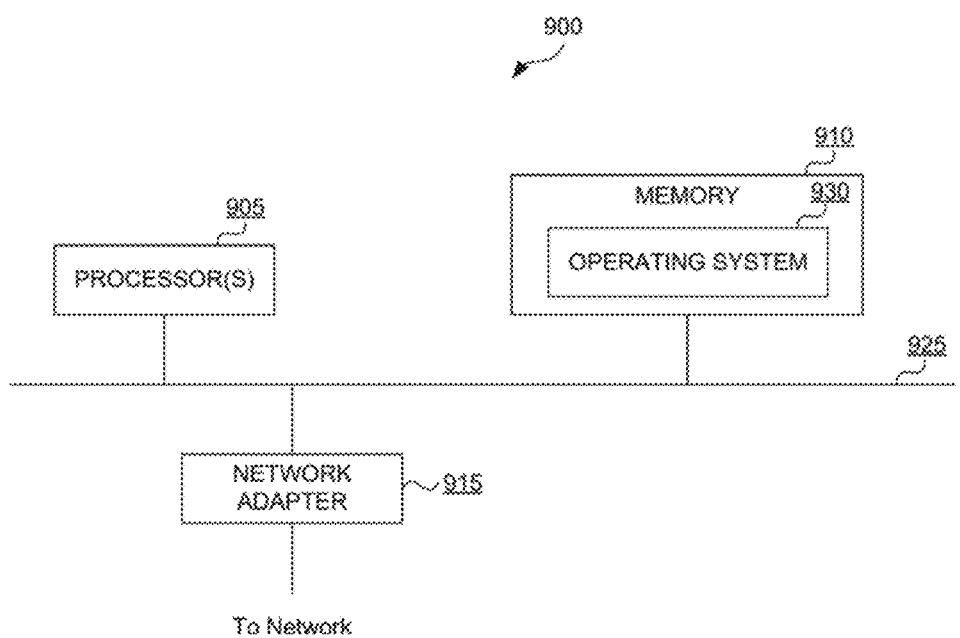
FIG. 9 is a block diagram illustrating an example of the architecture for a computer system or other control device that can be utilized to implement various portions of the presently disclosed technology.

FIG. 9 is a block diagram illustrating an example of the architecture for a computer system or other control device 900 that can be utilized to implement various portions of the presently disclosed technology. In FIG. 9, the computer system 900 includes one or more processors 905 and memory 910 connected via an interconnect 925. The interconnect 925 may represent one or more separate physical buses, point to point connections, or both, connected by appropriate bridges, adapters, and/or controllers. The interconnect 925, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 905 may include central processing units (CPUs) to control the overall operation of, for example, the host computer. In certain embodiments, the processor(s) 905 accomplish this by executing software or firmware stored in memory 910. The processor(s) 905 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 910 can be or include the main memory of the computer system. The memory 910 represents any suitable form of random access memory (RAM), read-only memory (ROM), flash memory, or the like, or a combination of such devices. In use, the memory 910 may contain, among other things, a set of machine instructions which, when executed by processor 905, causes the processor 905 to perform operations to implement embodiments of the presently disclosed technology.

Also connected to the processor(s) 905 through the interconnect 925 is a (optional) network adapter 915. The network adapter 915 provides the computer system 900 with the ability to communicate with remote devices, such as the storage clients, and/or other storage servers, and may be, for example, an Ethernet adapter or Fiber Channel adapter.

The techniques described herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium" or "computer-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof. Those skilled in the art will appreciate that the components and step or process elements illustrated in the figures described above may be altered in a variety of ways without deviating from the presently disclosed technology. For example, the order of the logic may be rearranged, substeps may be performed in parallel, illustrated logic may be omitted, other logic may be included, etc. In some implementations, one or more of the described components can execute one or more of the described steps.

Reference in this specification to "embodiments" (e.g., "some embodiments," "various embodiments," "one embodiment," "an embodiment," etc.) means that a particular feature, structure, or characteristic described in connection with the embodiment is included in at least one embodiment or implementation of the disclosure. The appearances of these phrases in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

As used herein, the phrase "and/or" as in "A and/or B" refers to A alone, B alone, and both A and B.

To the extent any materials incorporated by reference herein conflict with the present disclosure, the present disclosure controls. Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

From the foregoing, it will be appreciated that specific embodiments of the disclosed technology have been described herein for purposes of illustration, but that various modifications may be made without deviating from the technology. For example, the method 200 of FIG. 2 can be implemented with respect to any suitable mobile platform, including but not limited to those illustrated in FIG. 8. Certain aspects of the technology described in the context of particular embodiments may be combined or eliminated in other embodiments. For example, the method 400 of FIG. 4 can be implemented in combination with the method 300 of FIG. 3. Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

The invention claimed is:

1. A computer-implemented method for controlling a mobile platform, comprising:
    determining (a) environment information that indicates at least a portion of an environment around the mobile platform and (b) a location or orientation of the mobile platform within the environment information, based, at least in part, on data obtained from a sensor carried by the mobile platform;
    detecting navigation features including at least one of a lane line, edge line, guide line, zebra crossing, traffic light, traffic sign, guideboard, navigable surface or space, still obstacle, or moving obstacle based, at least in part, on sensor data obtained from one or more sensors carried by the mobile platform;
    integrating information corresponding to the navigation features with at least the environment information to generate a navigation map; wherein the integrating information corresponding to the navigation features with at least the environment information to generate a navigation map comprises: calculating three-dimensional coordinates of identified navigation features relative to the sensor, projecting the three-dimensional coordinates into a two-dimensional birds-eye view space to obtain two-dimensional coordinates, and projecting the two-dimensional coordinates onto the environment information;
    locating a relative location of the mobile platform based on a pre-determined navigation map, which has lower precision than the generated navigation map;
    obtaining an action prediction for controlling the mobile platform based on the relative location of the mobile platform, a target destination or direction, and the pre-determined navigation map, wherein the action prediction includes a prediction for at least one of lane changing, stopping, or turning of the mobile platform within a threshold distance of the mobile platform in a direction that the mobile platform is headed;
    determining an action for the mobile platform based, at least in part, on (a) the generated navigation map, (b) the determined location or orientation of the mobile platform, and (c) the action prediction; and
    causing the mobile platform to move in accordance with the determined action.

2. A computer-implemented method for controlling a mobile platform, comprising:
    obtaining environment information that indicates at least a portion of an environment around the mobile platform based, at least in part, on data received from a first sensor carried by the mobile platform;
    detecting navigation features based, at least in part, on sensor data obtained from at least one of the first sensor or a second sensor carried by the mobile platform;
    integrating information corresponding to the navigation features with at least the environment information to generate a navigation map; wherein the integrating information corresponding to the navigation features with at least the environment information to generate a navigation map comprises: calculating three-dimensional coordinates of identified navigation features relative to the first sensor or the second sensor, projecting the three-dimensional coordinates into a two-dimensional birds-eye view space to obtain two-dimensional coordinates, and projecting the two-dimensional coordinates onto the environment information;
    locating a relative location of the mobile platform based on a pre-determined navigation map, which has lower precision than the generated navigation map;
    obtaining an action prediction for controlling the mobile platform based on the relative location of the mobile platform, a target destination or direction, and the pre-determined navigation map, wherein the action prediction includes a prediction for at least one of lane changing, stopping, or turning of the mobile platform within a threshold distance of the mobile platform in a direction that the mobile platform is headed; and
    generating one or more navigation commands for at least partially controlling a motion of the mobile platform based, at least in part, on the generated navigation map and the action prediction.

3. The method of claim 2, wherein the environment information includes depth information.

4. The method of claim 2, wherein the environment information corresponds to a 3D representation of the at least a portion of environment around the mobile platform.

5. The method of claim 2, wherein the first sensor includes at least one of a LiDAR sensor or a stereo camera.

6. The method of claim 2, wherein the second sensor includes at least one of a camera, LiDAR sensor, ultrasonic sensor, or radar.

7. The method of claim 2, wherein the navigation features include at least one of a lane marking, edge line, guide line, zebra crossing, traffic light, traffic sign, guideboard, navigable surface or space, still obstacle, or moving obstacle.

8. The method of claim 2, wherein detecting navigation features is based, at least in part, on applying one or more artificial neural networks to the sensor data.

9. The method of claim 2, wherein integrating information corresponding to the navigation features with at least the environment information comprises associating at least a subset of the navigation features with one or more portions of the environment information.

10. The method of claim 2, wherein integrating information corresponding to the navigation features with at least the environment information is performed in real-time.

11. The method of claim 2, wherein integrating information corresponding to the navigation features with at least the environment information is based, at least in part, on a spatial or temporal transformation between or among reference systems associated with the first and second sensors carried by the mobile platform.

12. The method of claim 2, wherein integrating information corresponding to the navigation features with at least the environment information is based, at least in part, on an estimated location or orientation of the mobile platform.

13. The method of claim 12, wherein the estimated location or orientation satisfies one or more precision criteria.

14. The method of claim 2, wherein the navigation features are first navigation features and wherein the method further comprises obtaining second navigation features based, at least in part, on at least one pre-determined navigation map.

15. The method of claim 14, further comprising determining a location of the mobile platform relative to the pre-determined navigation map.

16. The method of claim 15, further comprising obtaining the second navigation features from the pre-determined navigation map around the determined location of the mobile platform.

17. The method of claim 14, further comprising integrating the second navigation features with at least the environment information to generate the local navigation map.

18. The method of claim 2, wherein the projecting the three-dimensional coordinates into a two-dimensional birds-eye view space to obtain two-dimensional coordinates comprise:
given three-dimensional coordinates (x, y, z) of the navigation features, projecting the three-dimensional coordinates into the two-dimensional birds-eye view space using a projection formula to obtain two-dimensional coordinates (x', y').

19. The method of claim 18, wherein, when the navigation features are traffic signs, a confidence update of a sign at current position is performed for identified traffic signs.

* * * * *